Jan. 7, 1936. E. O. STEUDEL Re. 19,813

CAKE PLATE

Original Filed Nov. 21, 1932

Inventor:
Erich O. Steudel,
By: Arthur M. Nelson
Atty.

Reissued Jan. 7, 1936

Re. 19,813

UNITED STATES PATENT OFFICE 19,813

CAKE PLATE

Erich O. Steudel, Chicago, Ill.

Original No. 1,979,911, dated November 6, 1934, Serial No. 643,644, November 21, 1932. Application for reissue June 29, 1935, Serial No. 29,094

9 Claims. (Cl. 65—15)

This invention relates to display devices and is particularly designed for the display of cakes or pies so as to better present them to a prospective customer.

The invention has among its principal objects the provision of a device of this character which will facilitate handling of the device and the commodity displayed, the device being capable of manufacture and sale at a price which will allow its being discarded after same has performed its function.

It is an object of the invention to construct the device of a material capable of being molded such as paper pulp and to provide means whereby the device may be readily grasped at an edge and is sufficiently strong to successfully support the commodity when the device is grasped by said edge.

The invention has as another object the production of a structure having means assisting to prevent accidental displacement of the commodity and in addition thereto has means for maintaining a portion of the device and the commodity in an elevated condition relatively to the plane of a surface upon which the device is deposited to thus dispose the above mentioned edge so that same is spaced from said surface to thereby facilitate grasping of said device at said edge.

It is a further object of the invention to provide a construction which allows a plurality of said devices to be arranged in a nested relation to thereby minimize the space required therefor during storage or shipment.

The invention has these and other objects, all of which will be explained in detail and more readily understood when read in conjunction with the accompanying drawing which illustrates various embodiments of which the invention is susceptible, it being therefore manifest that other modifications may be resorted to without departing from the spirit of the appended claims forming a part thereof.

In the drawing, Fig. 1 is a plan view of a display device constructed according to the invention;

Fig. 4 is a plan view of a portion of another structure which may be resorted to;

Figure 1:
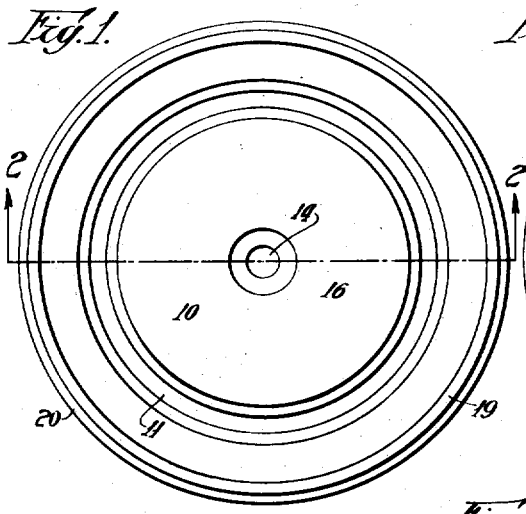

The invention contemplates the production of a display device of some cheap and inexpensive material such as paper pulp or other similar material which is capable of being molded thereby allowing the structure to be manufactured at a minimum of cost and in addition permits same to be discarded after it has performed its function. The invention contemplates the formation of the device with means which acts to reenforce the same to thereby sustain the weight of the commodity supported thereby during display and handling.

The structure illustrated in the drawing contemplates forming a display device of material similar to that above referred to and constructing same to provide a plate-like portion 10. This plate-like portion may be provided with a recess 11 which forms a rib which projects from the plane of the plate-like portion 10 and forms an extension and a support 12 having the surface 13.

The support 12 is designed to maintain the portion 10 and other portions located in the plane of said portion in an elevated condition relatively to a supporting surface to thereby display the commodity in a more advantageous manner.

Figure 2:
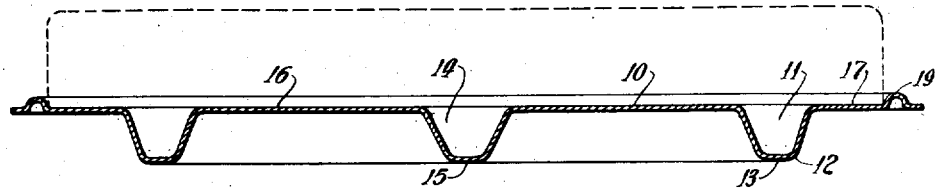
Fig. 2 is a section taken on line 2—2 of Fig. 1.

In the structure illustrated in Figs. 1 and 2, plate-like portion 10 is further provided with a centrally disposed depression 14 which has a base 15. The material forming the depression 14 extends from the plane of said portion 10 in the direction of the extension forming the support 12. This centrally disposed depression 14 is also designed to rest upon the supporting surface above referred to. The structure thus far explained is provided with an elevated supporting surface 16 which extends between the recess 11 and is provided with means at the center thereof for supporting the adjacent or central portion of a cake or pie placed upon this surface.

Figure 7:
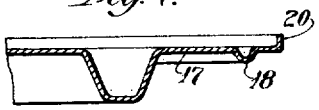
Fig. 7 is a sectional view of a fragment of a rim structure which may be embodied in the display device shown in Fig. 1.

The portion 10 of said device is further formed to provide the annular extension 17 which it will be noted is in substantially the same plane as the portion 16 and therefore this portion is also maintained in an elevated relation with respect to a supporting surface for the device. The annular extension 17 is formed to provide an upwardly extending rib 19 which extends from the plane of said plate. This rib 19 adds strength to the portion 17 and therefore assists in providing a structure of a strength sufficient to maintain the weight of the commodity displayed by the device and will prevent bending of the plate when the device is grasped at the edge thereof, and in addition provides means preventing accidental displacement of the commodity supported by said device. It may be stated that the extension 12 also adds rigidity to the structure and thus also assists in preventing flexing or bending of the structure when same is grasped at said edge in the manner above referred to. In the structure illustrated in Fig. 7, a rib 18 is employed which extends in a direction opposite to the extension 19 of Fig. 2 and in addition is provided with an annular flange 20. This flange is employed to prevent accidental displacement of the commodity supported by the device during handling of the device and the commodity.

Figure 3:
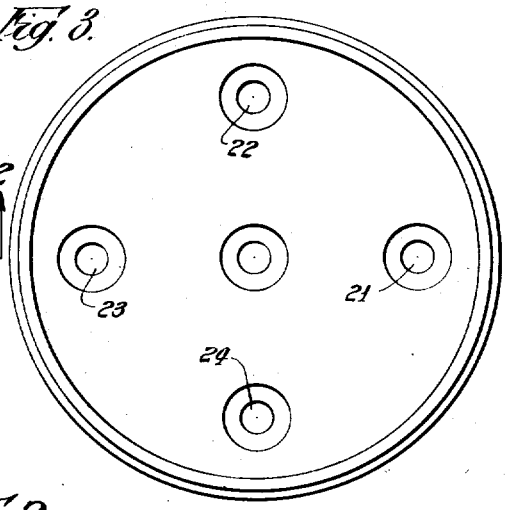
Fig. 3 is a plan view of modified constructions.

The structure illustrated in Fig. 3 substantially corresponds to that shown in Figs. 1 and 2, however, differs therefrom in that a plurality of depressions 21, 22, 23 and 24 are employed which are arranged in spaced relation to each other and provide supports for the device in a manner similar to the annular extension 12 shown in Fig. 2.

Figure 4:
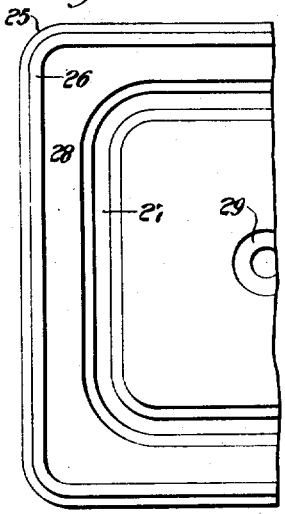

In Fig. 4 is illustrated a supporting device of another configuration and involves the use of an annular flange such as 25 and an annular depression such as 26 which forms a rib such as 19. This structure includes the annular depression 27 and extension 28 located between said depressions 26—27. A centrally disposed supporting element 29 is employed which functions in the manner described in connection with the depression 14 of Figs. 1 and 2.

Figure 5:
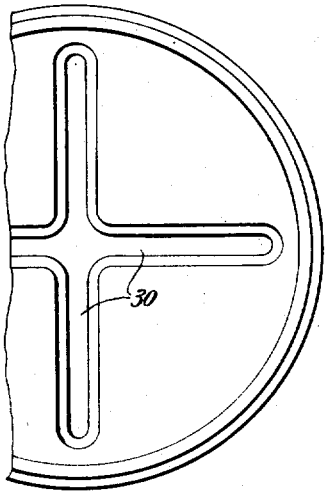
Fig. 5 is a plan view of a portion of a modified construction capable of performing the several advantages.

The structure illustrated in Fig. 5 contemplates the employment of the several elements heretofore referred to, however, differs in that radially arranged reenforcing ribs 30 are inserted instead of the annular rib such as illustrated in Figs. 1, 2 and 4. These radially arranged reenforcing ribs also act as supports for the device and maintain the outer edge thereof in an elevated relation to thus facilitate handling of the device and the commodity supported thereby, and in addition strengthen the structure and prevent bending thereof by the weight of the commodity when said device is grasped by the edge with the commodity supported thereby.

Figure 6:
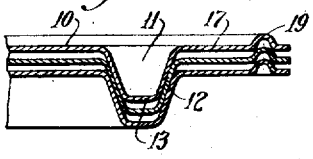
Fig. 6 shows several of the devices illustrated in Figs. 1 and 2 in a nested condition.

It is believed evident from the foregoing description that the structure employed allows several of said devices to be arranged relatively to each other in a nested relation as shown in Fig. 6, which will thus minimize the space necessary therefor during storage or shipment.

Manifestly the structure readily lends itself to the production thereof of paper pulp which may be readily molded and which is relatively cheap and thus provides a device which may be discarded after it has performed its function.

It is believed further evident that the structure provides means whereby the commodity to be displayed is supported in an elevated condition relatively to a supporting surface for the device and the commodity and that the device has means formed therein allowing same to be readily grasped at the edge thereof and which is of sufficient strength to maintain the weight of the commodity without fear of bending or buckling when the device and the commodity is handled.

It is further evident that the device is provided with means which will prevent accidental displacement of the commodity as it sometimes happens that a person lifting the commodity from a show window will tilt the commodity and thus cause same to slide and be displaced and dropped, thus injuring the commodity to such an extent as to render it unsaleable.

Having thus described the invention, what I claim as new and desire to cover by Letters Patent is:

1. A device of the kind described comprised of a plate, said plate having a portion between its center and edge formed to provide a substantially endless projection extending laterally of the plane of one side of said plate, said plate being formed to provide a plurality of projections extending laterally of the plane of the other side of said plate which are of a length to provide supports for said plate, the material surrounding said plurality of projections being in the same plane.

2. A plate of the kind described having a portion adjacent its edge formed to provide a hollow bead extending laterally from the plane thereof, and a plurality of tubular projections extending laterally from the plane of the plate and providing a support of a character to maintain the plate in spaced relation to a surface upon which the plate is adapted to be placed, the material adjacent the sides of said bead and projections being in the same plane.

3. A plate of the kind described having a hollow bead arranged between the center and edge and extending upwardly from the plane thereof, and a plurality of tubular tapered projections arranged between said bead and the center and extending transversely of the plane thereof and providing a support therefor, the material between said bead and projections and the center of said plate being in the same plane.

4. A plate of the kind described having a portion adjacent its edge formed to provide a hollow bead extending laterally from the plane thereof, and a plurality of hollow projections deeper than said bead and extending substantially radially from near the center of the plate and providing a support therefor, the length of said projections and their arrangement being such that the fingers of the hand may be extended under the plate a considerable distance.

5. A plate of the kind described having a portion adjacent its edge formed to provide a hollow bead extending laterally from the plane thereof, and a plurality of hollow projections deeper than said bead and extending substantially radially from near the center of the plate and providing a support therefor, the length of said projections and their arrangement being such that the fingers of the hand may be extended under the plate a considerable distance, and the material adjacent the sides of said bead and said projections being in the same plane.

6. A plate for supporting a commodity comprised of fibrous material formed with a plurality of hollow projections extending from the plate in a manner to provide a reenforcement and also support the plate in spaced relation to a surface upon which the plate is to be placed, and substantially endless means formed between the projections and the edge of the plate providing the dual function of a reenforcement and means assisting to maintain a commodity in fixed relation to the plate.

7. A plate for supporting a commodity comprised of fibrous material moulded with a plurality of projections forming depressions, said projections extending from the plate in a manner to provide a reenforcement and a support to position the plate in spaced relation to a surface upon which the plate is to be placed, and means providing a substantially endless reenforcement moulded between the projections and the edge of the plate, said depressions and said means also being of a character to permit portions of a commodity to cooperate with said depressions and said means and assist to maintain the commodity in a fixed relation to the plate.

8. A plate of the kind described comprising a sheet of fibrous material substantially flat throughout its major portion having certain portions formed to provide a plurality of hollow annular projections entirely within the margin of the plate and extending downwardly from the plane of said major portion of the plate, said projections being disposed to reenforce the plate and at least one of said projections also providing supporting means to space said major portion of the plate above the surface upon which the plate is to be used.

9. A plate of the kind described comprising a sheet of fibrous material substantially flat throughout its major portion and having certain portions formed to provide a hollow central projection and at least one hollow annular projection between said central projection and the edge of the plate and extending downwardly from the plane of said major portion of the plate, said projections being disposed to provide supporting means to space said major portion of the plate above the surface upon which the plate is placed, said annular projection serving as a reenforcement for the plate.

ERICH O. STEUDEL.